United States Patent
Yang et al.

(10) Patent No.: US 10,832,143 B2
(45) Date of Patent: Nov. 10, 2020

(54) COMMON DATA REPOSITORY FOR IMPROVING TRANSACTIONAL EFFICIENCIES ACROSS ONE OR MORE COMMUNICATION CHANNELS

(71) Applicant: Accenture Global Services Limited, Dublin (IE)

(72) Inventors: Junmin Yang, Antibes (FR); Alexandre Naressi, Valbonne (FR); Christian Souche, Cannes (FR); Richard Vidal, Antibes (FR)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 1287 days.

(21) Appl. No.: 14/956,239

(22) Filed: Dec. 1, 2015

(65) Prior Publication Data
US 2017/0024646 A1 Jan. 26, 2017

(30) Foreign Application Priority Data
Jul. 20, 2015 (EP) .................................... 15290190

(51) Int. Cl.
*G06N 5/04* (2006.01)
*G06N 5/02* (2006.01)
(Continued)

(52) U.S. Cl.
CPC .......... *G06N 5/022* (2013.01); *G06Q 10/0639* (2013.01); *G06N 3/084* (2013.01); *G06N 5/04* (2013.01); *G06Q 30/0201* (2013.01)

(58) Field of Classification Search
None
See application file for complete search history.

(56) References Cited

U.S. PATENT DOCUMENTS 7,281,170 B2   10/2007   Taylor et al.
7,409,593 B2   8/2008    Aaron
(Continued)

OTHER PUBLICATIONS

Yifeng Zhou, Data Driven Process Monitoring Based on Neural Networks and Classification Trees, Texas A&M University (2004) pp. 1-129 (Doctoral Thesis) (Year: 2004).*
(Continued)

*Primary Examiner* — Wilbert L Starks
(74) *Attorney, Agent, or Firm* — Mannava & Kang, P.C.

(57) ABSTRACT

Examples of the disclosure enable an information processing system to automatically implement a user interaction diagnostic engine. In some examples, the information processing system analyzes documents to identify parameters associated with profile features and performance metrics. Based on the parameters, correlation values between the profile features and one or more performance metrics are determined. Based on the correlation values, at least one profile feature is identified to improve a parameter associated with the performance metrics. A predictive model associated with the profile features and the performance metrics is generated. One or more actionable items configured to modify the at least one profile feature are determined such that, based on the predictive model, a parameter associated with the performance metrics are predicted to improve upon execution of the one or more actionable items.

20 Claims, 7 Drawing Sheets

(51) Int. Cl.
*G06Q 10/06* (2012.01)
*G06N 3/08* (2006.01)
*G06Q 30/02* (2012.01)

(56) References Cited

U.S. PATENT DOCUMENTS

| | | |
|---|---|---|
| 9,031,889 B1 | 5/2015 | Basu et al. |
| 2012/0130771 A1 | 5/2012 | Kannan et al. |
| 2014/0310222 A1 | 10/2014 | Davlos et al. |

OTHER PUBLICATIONS

Xiang, et al., Modeling Relationship Strength in Online Social Networks, WWW 2010, 2010, pp. 1-10 (Year: 2010).*
"The extended European search report" on European Patent Application No. 15290190.6, European Patent Office, dated Jan. 22, 2016, 9 pages.

* cited by examiner

| Profile Feature | Significance with Service Cost per Month |
|---|---|
| Outsource rate of the call center | 17% |
| Number of topics in the web FAQ | 68% |
| Number of pages on the support web site | 76% |
| Is a SEO strategy in place? | 38% |
| Annual Web advertising budget for customer service | 7% |
| Number of topics covered by an artificial intelligence | 35% |
| Number of customer service representatives | 99% |
| Other features | xxx |

COMMON DATA REPOSITORY FOR IMPROVING TRANSACTIONAL EFFICIENCIES ACROSS ONE OR MORE COMMUNICATION CHANNELS

CROSS-REFERENCE TO RELATED APPLICATION

This application claims priority to European Patent Application Number 15290190.6 filed Jul. 20, 2015 entitled "Common Data Repository for Improving Transactional Efficiencies Across One or More Communication Channels," which is incorporated herein by reference in its respective entirety.

BACKGROUND

Services may be provided to a user through a plurality of communication channels including a telephone and the Internet. Known methods and systems for identifying benefits and drawbacks for each of the plurality of communication channels may be tedious, cumbersome, or time-consuming. Moreover, due at least in part on the volume of user interactions, user interactions are typically identified and/or analyzed on a reactionary or ad-hoc basis.

SUMMARY

Examples of the disclosure enable an information processing system to automatically generate a common data repository including one or more documents associated with providing services through a plurality of communication channels such that one or more computing devices may be automatically configured on a proactive basis to improve the transactional efficiency of services provided through the plurality of communication channels. In some examples, the information processing system analyzes the documents to identify a plurality of parameters associated with a plurality of profile features and a plurality of performance metrics. Based on the plurality of parameters, correlation values between the profile features and one or more performance metrics are determined Based on the correlation values, at least one profile feature is identified to improve one or more parameters associated with the one or more performance metrics. A predictive model associated with the profile features and the one or more performance metrics is generated. One or more actionable items configured to modify a parameter associated with the at least one profile feature are determined such that, based on the predictive model, the one or more parameters associated with the one or more performance metrics are predicted to improve upon execution of the one or more actionable items.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

The subject matter described herein relates generally to information processing and, more specifically, to automatically implementing a user interaction diagnostic engine to efficiently extract and analyze information from a plurality of documents. Examples of the disclosure enable an information processing system to automatically generate a common data repository including a plurality of documents and data associated with the plurality of documents from a plurality of sources, thereby potentially improving a robustness and/or an effectiveness of the common data repository. The common data repository enables transactional efficiencies to be improved across one or more communication channels. Moreover, examples of the disclosure enable one or more actionable items to be determined on a proactive basis, thereby potentially improving a transactional efficiency of services provided through the plurality of communication channels. Examples described herein enable a computer system to (i) analyze a plurality of documents to identify a plurality of parameters associated with a plurality of profile features and a plurality of performance metrics, (ii) determine a plurality of correlations between the plurality of profile features and the plurality of performance metrics, (iii) determine a plurality of correlation values between the plurality of profile features and one or more performance metrics, (iv) identify at least one profile feature to improve one or more performance metrics, (v) generate a predictive model associated with the plurality of profile features and one or more performance metrics, and (vi) determine one or more actionable items configured to modify a parameter associated with the at least one profile feature.

Aspects of the disclosure enable a common data repository to be efficiently and effectively generated to include data extracted from one or more sources. Examples of the disclosure accelerate a data accumulation phase and/or an information structure phase to generate one or more actionable items in an organized, resource-efficient, and time-efficient manner. For example, data may be accumulated, and information may be structured to calculate one or more correlation values tailored to a particular communication channel, company, industry, and/or target segment. In this way, the common data repository may be used to provide a deep understanding of service performance and provides concrete actionable items that may be used to improve the service performance for a targeted metric, communication channel, company, industry, and/or segment. Examples described herein enable a computing system to generate a profile of a company, benchmark the profile against other profiles (e.g., competitors), and/or identify one or more actionable items to improve the profile in an efficient and organized manner.

By incorporating information from a plurality of sources in the manner described in this disclosure, some examples improve efficiency of user interactions by analyzing documents to identify topical issues and generating one or more actionable items to address the topical issues, enhance reliability of a common data repository by retrieving and incorporating data from a plurality of sources, improve communication between disparate systems by creating a forum to share or access information (e.g., the common data repository), improve system functionality by generating one or more actionable items to address topical issues, and/or reduce error rate by automating the analysis of documents, the determination of correlations, the determination of correlation values, the generation of a predictive model, and/or the generation of actionable items.

The methods and systems described herein may be implemented using computer programming or engineering techniques including computer software, firmware, hardware or a combination or subset thereof, to implement operations including at least one of a) retrieving a plurality of documents from a plurality of sources; b) analyzing a plurality of documents to identify a plurality of parameters associated with a plurality of profile features and a plurality of performance metrics; c) determining one or more correlations between a plurality of parameters; d) determining a plurality of correlation values between a plurality of profile features and one or more performance metrics; e) determining whether at least one profile feature is statistically relevant; f) identifying at least one profile feature configured to improve one or more parameters associated with one or more performance metrics; g) generating a predictive model associated with a plurality of profile features and one or more performance metrics; h) determining whether one or more actionable items are determined based on a profile feature; and i) determining one or more actionable items configured to modify a parameter associated with at least one profile feature.

Figure 1:
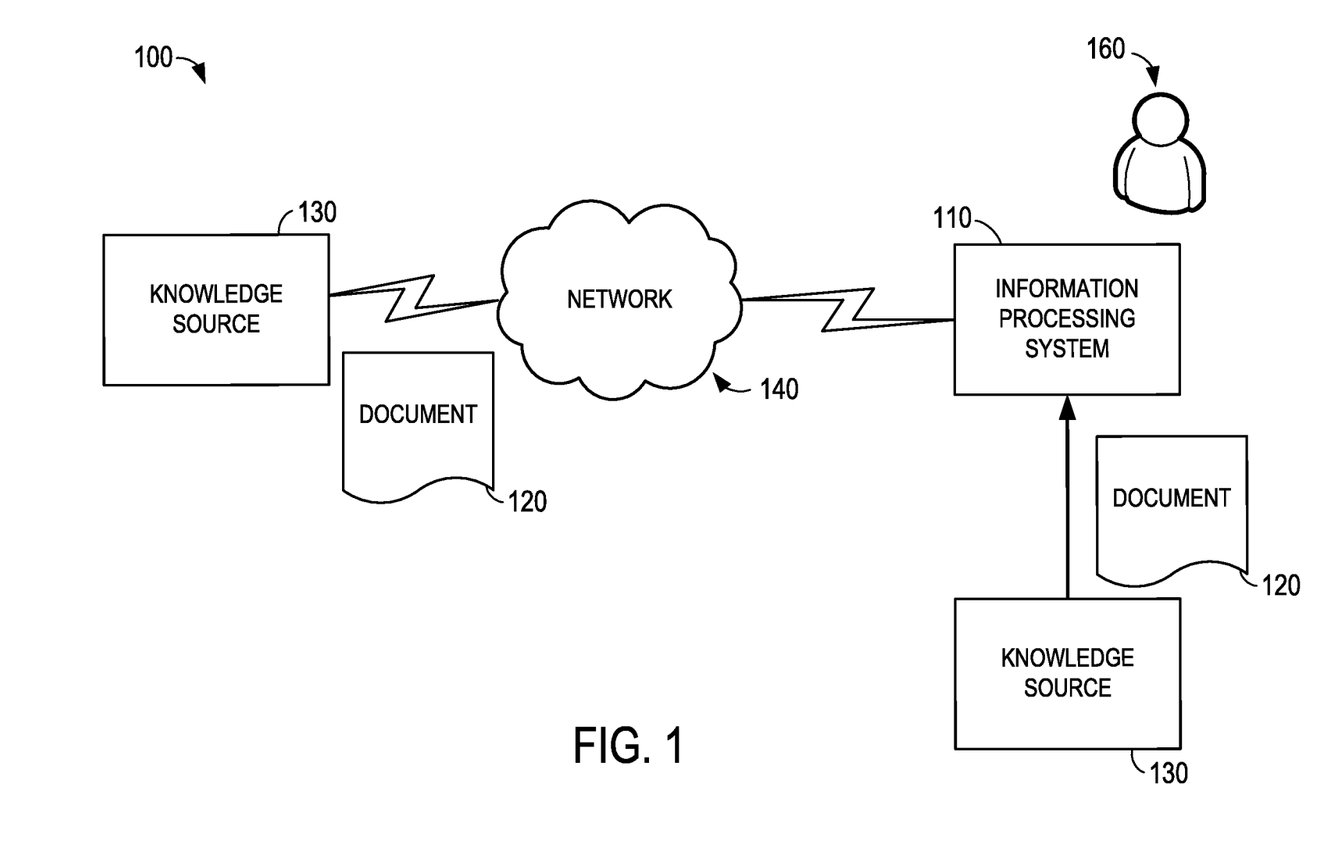
FIG. 1 is a diagram illustrating an example environment for implementing a user interaction diagnostic engine.

FIG. 1 illustrates an example environment 100 for implementing a common data repository and/or a user interaction diagnostic engine in accordance with one example of the subject matter described herein. In the environment 100, an information processing system 110 (or other computing device) receives or retrieves a plurality of documents 120 from a plurality of communication channels or knowledge sources 130. Although only two documents 120 and two knowledge sources 130 are depicted, the environment 100 may include any number of documents 120 and/or knowledge sources 130 that enables the environment 100 to function as described herein. Even though the environment 100 relates to a customer service scenario, it should be noted that the present disclosure applies to various other environments in which a user interaction platform is implemented based on one or more documents 120.

The information processing system 110 may be coupled to one or more knowledge sources 130 via a network 140. The network 140 includes wireless and/or wired communication protocols and enables the information processing system 110 to communicate with one or more knowledge sources 130. Additionally or alternatively, the information processing system 110 may be directly coupled to one or more knowledge sources 130. The information processing system 110 may be coupled to the knowledge sources 130 in any manner that enables the environment 100 to function as described herein.

A user 160 may use the information processing system 110 to analyze various documents 120 to mine the documents 120 for content. For example, a document 120 may be analyzed to identify customer behavior or customer service. Documents 120 may include any file that includes or is associated with customer behavior or customer service data. For example, documents 120 may include call center transcripts, message boards, community forums, websites, Frequently Asked Question (FAQ) pages, social media conversations, and/or other documents associated with one or more user interaction issues. In at least some examples, one set of documents 120 are received or retrieved from a knowledge source 130 internal to a company (e.g., internal memo), and another set of documents 120 are received or retrieved from a knowledge source 130 external to the company (e.g., a social media feed).

Figure 2:
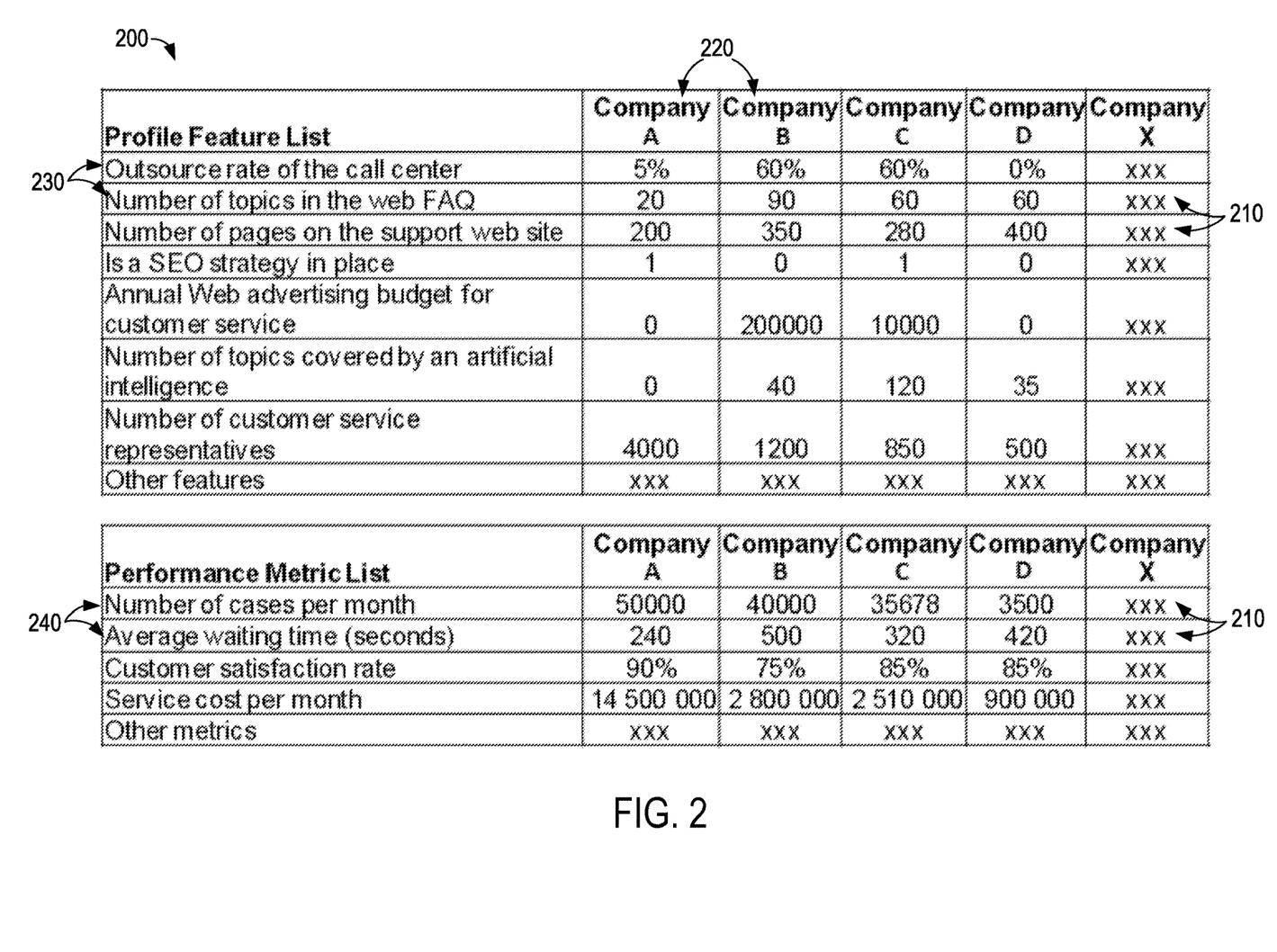
FIG. 2 is an example dataset illustrating data extracted from one or more user interactions in an environment, such as the environment shown in FIG. 1.

FIG. 2 is an example dataset 200 extracted from a plurality of documents 120. In at least some examples, the dataset 200 is presented to a user 160. In this example, the dataset 200 is tailored to a particular industry (e.g., telecommunications) and a particular target or customer segment (e.g., customers between 40 and 60 years old). Alternatively, the dataset 200 may be associated with any number of industries and/or customer segments, and the industry and/or the customer segment may have any breadth or scope that enables the information processing system 110 to function as described herein.

The documents 120 include or are associated with a plurality of parameters 210. In some examples, the information processing system 110 analyzes or processes the documents 120 to extract or identify one or more parameters 210. In some examples, one parameter 210 may be identified based on content of at least one document 120, and another parameter 210 may be identified based on a property (e.g., metadata) of at least one document 120. Content may include, for example, subject matter included or contained within the document 120 (e.g., text in a call transcript, text on a website). Properties may include, for example, subject matter associated with or about the document 120 (e.g., length of a conversation, caller profile, customer service representative profile, metadata).

The information processing system 110 may identify or generate one or more profiles 220 based on one or more parameters 210. A profile 220 is representative of or is associated with a group or entity, such as an industry, a company, a brand, a division, or a subsidiary. For example, the profile 220 may include profile feature parameters 210 associated with one or more profile features 230, performance metric parameters 210 associated with one or more performance metrics 240, and/or customer segment parameters 210 associated with one or more customer segments associated with the entity. In at least some examples, one or more documents 120 are analyzed to identify one or more profiles 220, and a profile 220 is generated by collecting and/or extracting associated profile features 230, performance metrics 240, and/or customer segments. In some examples, the information processing system 110 may organize or tailor one or more parameters 210 based on the profile.

The information processing system 110 may identify or generate one or more profile features 230 and/or performance metrics 240 based on one or more parameters 210. Profile features 230 are factors that are directly or relatively controllable by a company associated with a corresponding profile 220. In at least some examples, a profile feature 230 may be associated with a technical element, such as a physical communication hardware (e.g., web server, switchboard). In addition to the profile features 230 illustrated in FIG. 2, examples of profile features 230 include "a quantity of web servers" (e.g., the company is able to control a quantity of web servers), "a quantity of switchboards (e.g., the company is able to control a quantity of switchboards), "Is a search engine present on a website" (e.g., the company is able to control whether it has a search engine on its website), "Is a social community present on a website" (e.g., the company is able to control whether it has a social community on its website), and "Is a toll-free call center in place" (the company is able to control whether it has a toll-free call center). Alternatively, profile features 230 may include any factors that enable the information processing system 110 to function as described herein. Non-numerical values (e.g., yes and no) may be replaced by a numerical representation (e.g., 1 for yes, 0 for no) to quantify at least some parameters 210.

Performance metrics 240 are factors that are indicative or representative of an effect or byproduct of the profile features 230. Performance metrics 240 are not directly controllable by a company associated with a corresponding profile 220. For example, a company may not have direct control over a number of cases per month, an average waiting time, a customer satisfaction rate, and/or a service cost per month. Rather, these factors may be related to one or more profile features 230 and, thus, a performance metric parameter 210 associated with a performance metric 240 may be adjusted by directly controlling or modifying a profile feature parameter 210 associated with one or more profile features 230. One or more performance metric parameters 210 associated with a performance metrics 240 may be calculated or determined based on the profile features 230. In addition to the performance metrics 240 illustrated in FIG. 2, examples of performance metrics 240 include an average interaction cost and a NET PROMOTER SCORE brand score (NET PROMOTER SCORE is a registered trademark of Fred Reichheld, Bain & Company and Satmetrix). A NET PROMOTER SCORE brand score may be used to gauge customer loyalty. Alternatively, performance metrics 240 may include any factors that enable the information processing system 110 to function as described herein. In at least some examples, a performance metric 240 may indicate a functioning of a computer or communication system.

Target or customer segments are groups of customers that share one or more characteristics. For example, Table 1 illustrates a plurality of characteristics of an example customer segment and their respective customer segment parameters 210.

TABLE 1

Customer Segment Characteristics

| Customer Segment Characteristics | Parameter |
|---|---|
| Location of customers | USA |
| Average annual revenue of customers | $60,000 |
| Average age of customers | 37 years old |

A customer segment may include any combination of characteristics that enable the information processing system 110 to function as described herein. In some examples, the information processing system 110 may organize or tailor one or more parameters 210 based on the customer segment. For example, a particular profile feature 230 may be associated with a first profile feature parameter 210 for a first customer segment and with a second profile feature parameter 210 for a second customer segment. Similarly, a particular performance metric 240 may be associated with a first performance metric parameter 210 for a first customer segment and with a second performance metric parameter 210 for the second customer segment. In at least some examples, a profile feature parameter 210 is associated with a performance metric parameter 210 where the parameters 210 are tailored to a common group (e.g., industry, company, customer segment). In some examples, one or more profile feature parameters 210 and/or performance metric parameters 210 are the same or consistent across a plurality of customer segments. Alternatively, one or more parameters 210 may be different or inconsistent across a plurality of customer segments.

Figure 3:
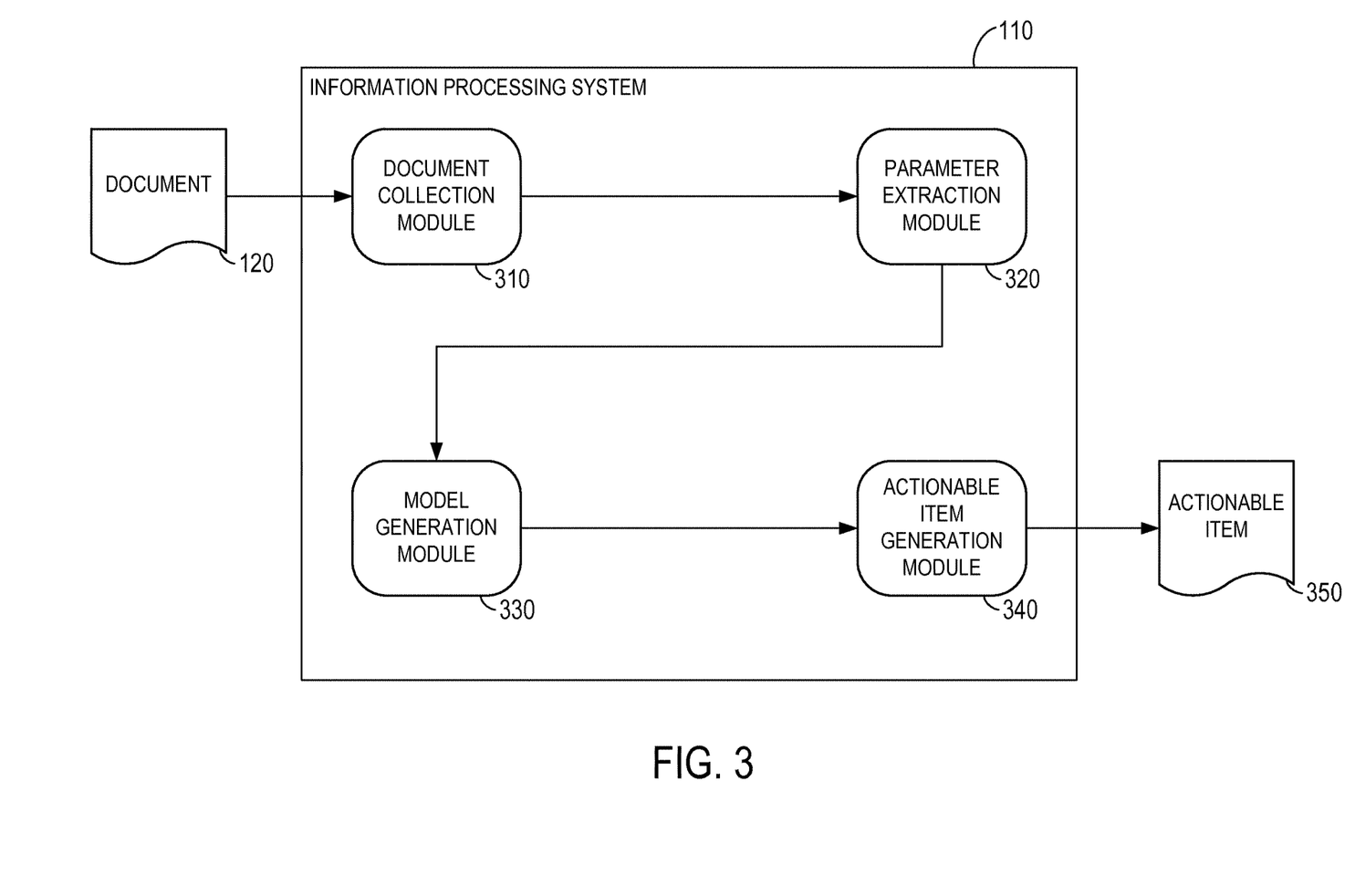
FIG. 3 is a block diagram illustrating example modules that may be used to implement a user interaction diagnostic engine in an environment, such as the environment shown in FIG. 1.

FIG. 3 illustrates example modules that may be used to implement a user interaction diagnostic engine. The information processing system 110 includes a document collection module 310 configured to receive or retrieve one or more documents 120 from one or more knowledge sources 130. The document collection module 310 is configured to extract at least some information (e.g., text, metadata) from a document 120. In at least some examples, the document collection module 310 formats at least some information to improve a functionality or usefulness of the information. A parameter extraction module 320 is configured to analyze one or more documents 120 and identify or extract one or more parameters 210 from the information in the documents 120. In some examples, one parameter 210 is extracted from the content of a document 120, and another parameter 210 is extracted from the metadata of a document 120.

A model generation module 330 is configured to identify or determine one or more patterns or correlations between the parameters 210. The model generation module 330 may implement data analytics to determine one or more patterns or correlations between one or more profile features 230 and one or more performance metrics 240. For example, the model generation module 330 may calculate a correlation value for one or more profile features 230 and one or more performance metrics 240. The correlation value may be compared with a predetermined threshold (e.g., absolute or relative) to determine whether a particular profile feature 230 is statistically relevant to improving a performance metric parameter 210 associated with a particular performance metric 240. That is, the correlation value is indicative of a relationship strength between a profile feature 230 and a performance metric 240.

The model generation module 330 may identify one or more correlations using data mining techniques including classification and/or clustering. For example, the model generation module 330 may determine that there is an inverse linear relationship between a number of customer service representatives and an average response time. For another example, the model generation module 330 may determine that, for a particular customer segment (e.g., customers less than 30 years old), there is a strong relationship between social media conversations and up-selling or cross-selling conversions. Alternatively, the model generation module 330 is configured to identify or determine any relationship (if any) between any two parameters 210.

Based on the correlations and/or the correlation values, the model generation module 330 is configured to generate one or more predictive models. The predictive model identifies causality among or between one or more profile features 230 and one or more performance metrics 240. The predictive model may be generated using machine learning techniques including multilayer perceptron, linear regression, logistic regression, decision tree learning, and/or random forest. A predictive model may be generated for any combination of profiles 220 and/or customer segments.

An actionable item generation module 340 is configured to use the predictive model to determine or generate one or more actionable items 350 to facilitate improving one or more parameters 210. An actionable item 350 is associated with a modification of a profile feature parameter 210 associated with one or more profile features 230 to improve a performance metric parameter 210 associated with one or more performance metrics 240. The actionable item 350 may be determined based on a relationship strength between a profile feature 230 and a performance metric 240 and/or whether a profile feature 230 is statistically relevant to improving a performance metric parameter 210 associated with the performance metric 240. For example, one actionable item 350 may be determined to increase a NET PROMOTER SCORE brand score for customers older than 60 years old (e.g., the actionable item 350 is targeted to a particular customer segment), and another actionable item 350 may be determined to increase a conversion rate on customers visits on web pages and mobile apps. The information processing system 110 enables a user 160 to benchmark a profile 220 (e.g., a first profile) against one or more other profiles 220 (e.g., a second profile) and determine or identify one or more actionable items 350 to improve the profile 220 relative to the other profiles 220.

One or more actionable items 350 are executed or implemented to modify a profile feature parameter 210 associated with one or more profile features 230 such that a transactional efficiency of services provided through one or more communication channels is improved. In at least some examples, an actionable item 350 may be executed to automatically adjust a technical element, such as a number of topics in a web FAQ, a number of pages on a support web site, and/or a number of topics covered by an artificial intelligence. Alternatively, one or more actionable items 350 may be executed to perform any operation that enables the information processing system 110 to function as described herein.

Figure 4:
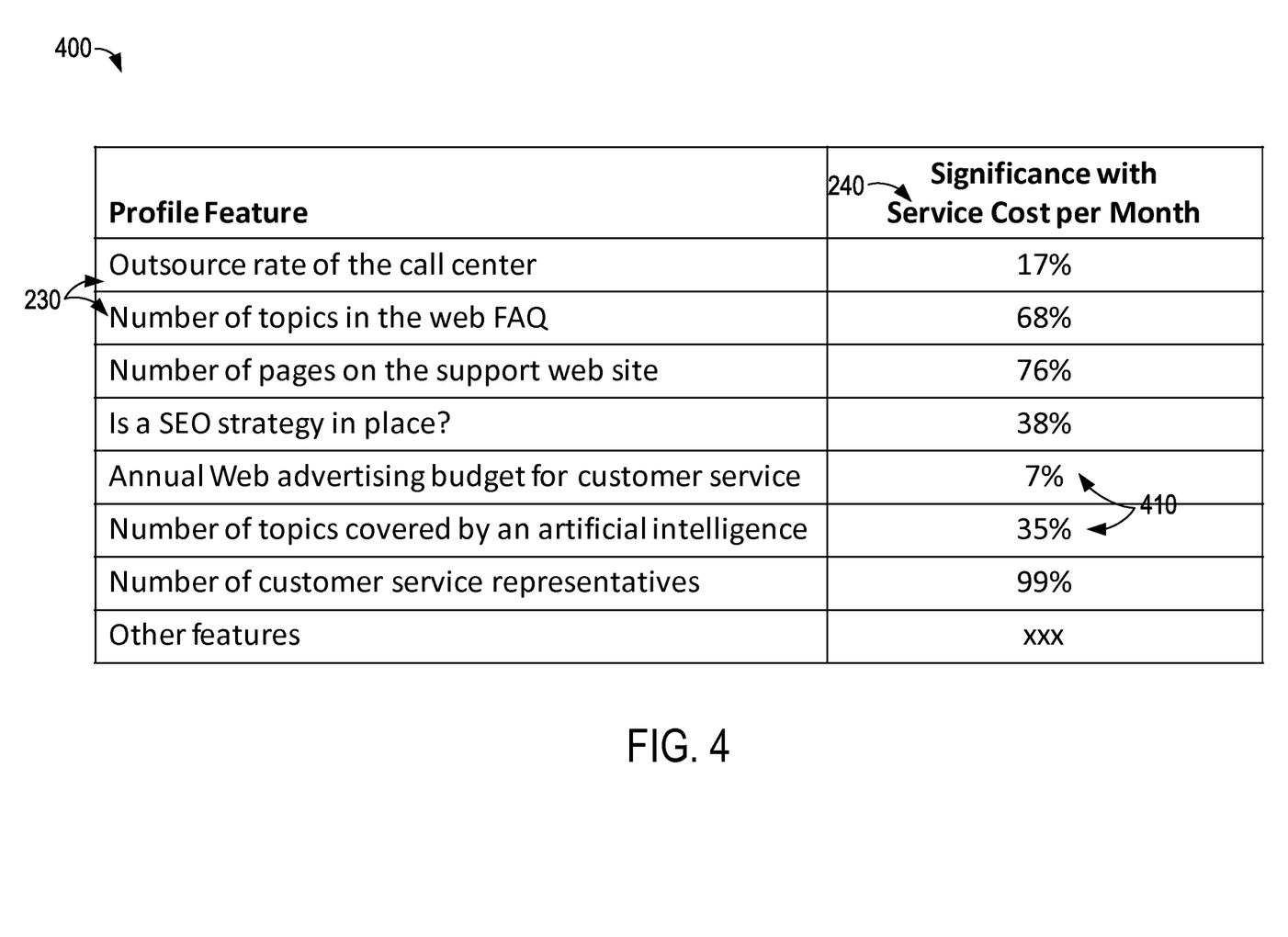
FIG. 4 is an example dataset illustrating a plurality of correlation values that may be generated in an environment, such as the environment shown in FIG. 1.

FIG. 4 is an example dataset 400 that illustrates a plurality of correlation values 410 between a plurality of profile features 230 and a performance metric 240. A correlation value is indicative of a statistical significance of two datasets (e.g., profile features 230 and performance metrics 240). In at least some examples, the dataset 400 is presented to a user 160. In the example illustrated in FIG. 4, a Pearson product-moment correlation coefficient is calculated for the plurality of profile features 230 and a particular performance metric 240 (e.g., service cost per month). A Pearson product-moment correlation coefficient is one example of a correlation value. Alternatively, the correlation values 410 may be calculated using any other algorithm that enables the information processing system 110 to function as described herein. For example, a p-value is another example of a correlation value.

The Pearson product-moment correlation coefficient is a value between +1 and −1 inclusive that is indicative of a statistical significance of the two datasets (e.g., profile feature 230 and performance metric 240), wherein a Pearson product-moment correlation coefficient having an absolute value closer to one (e.g., one hundred percent) is considered to be more statistically relevant. A positive Pearson product-moment correlation coefficient indicates a positive correlation between the two datasets, and a negative Pearson product-moment correlation coefficient indicates a negative correlation between the two datasets. In at least some examples, a Pearson product-moment correlation coefficient having an absolute value that is greater than a predetermined threshold (e.g., a significance level) is considered to be statistically relevant. That is, based on whether one or more correlation values 410 satisfy a predetermined threshold, at least one corresponding profile feature 230 may be identified as being statistically significant to one or more performance metrics 240 such that one or more performance metric parameters 210 may be improved by managing or modifying a profile feature parameter 210. When applied to a sample, a Pearson product-moment correlation coefficient $r_{xy}$ for dataset $\{x_1, \ldots x_n\}$ including n values (e.g., a particular profile feature 230 associated with n documents 120) and another dataset $\{y_1, \ldots y_n\}$ including n values (e.g., a particular performance metric 240 associated with n documents 120) may be calculated using Equation 1 shown below:

$$r_{xy} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad (1)$$

where $\bar{x}$ is a sample mean for dataset $\{x_1, \ldots x_n\}$, and $\bar{y}$ is a sample mean for dataset $\{y_1, \ldots y_n\}$.

In the example illustrated in FIG. 4, the profile features 230 associated with a Pearson product-moment correlation coefficient of greater than sixty percent (e.g., number of topics in the web FAQ, number of pages on the support web site, and number of customer service representatives) are determined to be statistically relevant to improving the performance metric 240. Alternatively, the significance level may be set at any threshold that enables the information processing system 110 to function as described herein.

Figure 5:
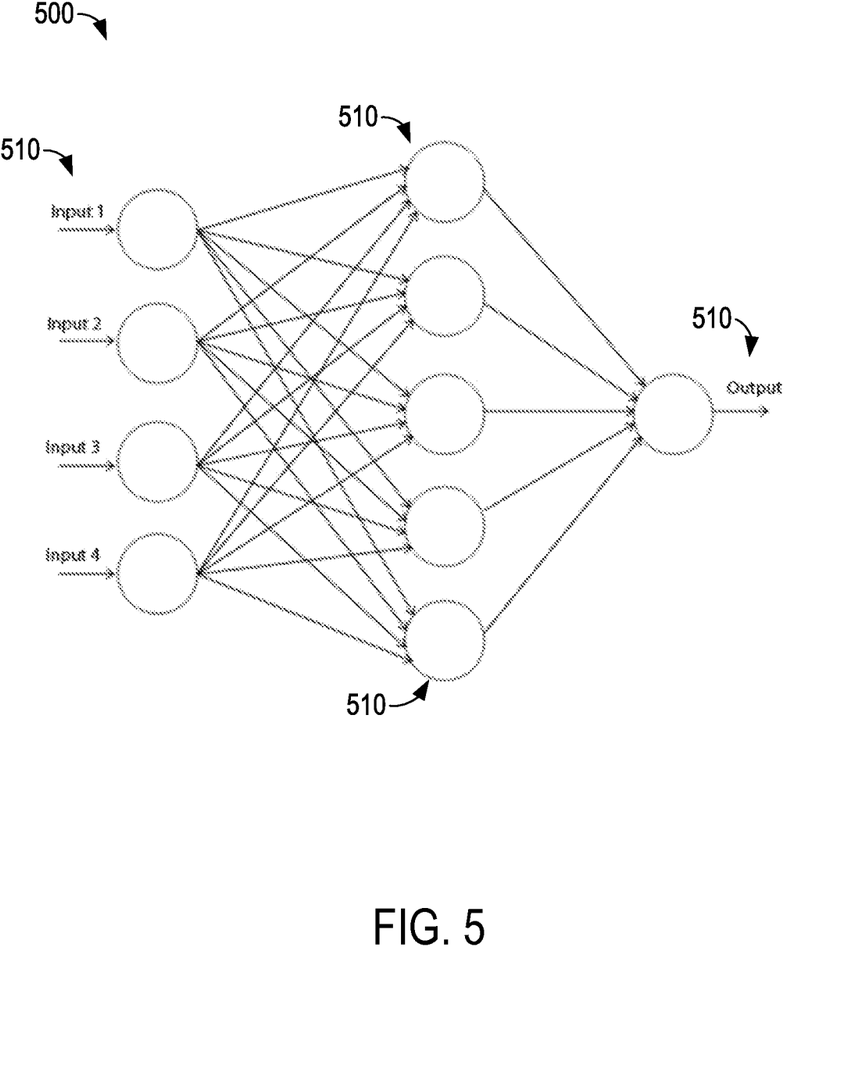
FIG. 5 is a block diagram illustrating an example predictive model that may be generated in an environment, such as the environment shown in FIG. 1.

FIG. 5 illustrates an example predictive model 500 that may be generated using the information processing system 110. In this example, the predictive model 500 is a multilayer perceptron including a plurality of perceptrons 510. Alternatively, the predictive model 500 may be and/or include any algorithm, system, architecture and/or model that enables the information processing system 100 to function as described herein. One or more perceptrons 510 are configured to receive one or more inputs, use an activation function to process the one or more inputs, and generate an output. In at least some examples, the predictive model 500 may be generated using backpropagation learning. Alternatively, the predictive model 500 may be based on any algorithm or mechanism that enables the information processing system 110 to function as described herein.

In one example, a perceptron 510 receives an input dataset $\{a_1, \ldots a_n\}$ including n values, performs a weighted sum of its inputs (neta), and applies an activation function σ to generate an output o. In at least some examples, the perception 510 is offset by a bias b. Accordingly, the output o may be calculated using Equation (2) shown below:

$$o = \sigma(b + \Sigma_{i=1}^{n} a_i w_i) \quad (2)$$

where w is a weight associated with the input. The activation function σ may be any function that enables the information processing system 110 to function as described herein.

In this example, the predictive model 500 includes a perceptron 510 (Linear Node 0) having a linear activation function configured to generate an output (neta), and a plurality of perceptrons 510 (Sigmoid Nodes 1-4) each having a sigmoidal activation function configured to generate an output ($1/(1+e^{-neta})$). Tables 2-6 illustrate the perceptrons 510 of the example predictive model 500:

TABLE 2

Linear Node 0

| Inputs | Weights |
|---|---|
| Threshold | 1.2042804281684596 |
| Node 1 | −1.2763901865108125 |
| Node 2 | −0.7473515853387156 |
| Node 3 | −0.8181415965953124 |
| Node 4 | 0.18842839421791086 |

TABLE 3

Sigmoid Node 1

| Inputs | Weights |
|---|---|
| Threshold | 0.01193782145214036 |
| Outsource rate of the call center | 0.1167787895151179 |
| Number of topics in the web FAQ | 0.32117016140059934 |
| Number of pages on the support web site | 0.5691388380203136 |
| Is a SEO strategy in place? | −0.38509262330403693 |
| Annual Web advertising budget for customer service | −0.26468761043549427 |
| Number of topics covered by an artificial intelligence | 0.597945152781088 |
| Number of customer service representatives | −0.8781541450624262 |

TABLE 4

Sigmoid Node 2

| Inputs | Weights |
|---|---|
| Threshold | −0.14798949658469432 |
| Outsource rate of the call center | 0.09752329330197644 |
| Number of topics in the web FAQ | 0.23571324703311447 |
| Number of pages on the support web site | 0.47842611283596775 |
| Is a SEO strategy in place? | −0.23642644446570268 |
| Annual Web advertising budget for customer service | −0.16043858231289268 |
| Number of topics covered by an artificial intelligence | 0.48476240864921266 |
| Number of customer service representatives | −0.5843888687287571 |

TABLE 5

Sigmoid Node 3

| Inputs | Weights |
|---|---|
| Threshold | −0.1107746410845628 |
| Outsource rate of the call center | 0.026220933631043702 |
| Number of topics in the web FAQ | 0.2866511182201573 |
| Number of pages on the support web site | 0.4602070722687905 |
| Is a SEO strategy in place? | −0.2717181399288609 |
| Annual Web advertising budget for customer service | −0.1967041189059601 |
| Number of topics covered by an artificial intelligence | 0.47251808174227705 |
| Number of customer service representatives | −0.6620678167154158 |

TABLE 6

Sigmoid Node 4

| Inputs | Weights |
|---|---|
| Threshold | −0.20193181387273673 |
| Outsource rate of the call center | 0.06170803297469558 |
| Number of topics in the web FAQ | 0.0595845156770268 |
| Number of pages on the support web site | 0.07816448319921468 |
| Is a SEO strategy in place? | −0.08281628736548995 |
| Annual Web advertising budget for customer service | 0.15772822146195953 |
| Number of topics covered by an artificial intelligence | 0.07367353186405592 |
| Number of customer service representatives | −0.08576175580218487 |

Alternatively, the predictive model 500 may include any combination of perceptrons that enable the information processing system 110 to function as described herein.

The predictive model 500 may be used or implemented to identify an affect of at least one profile feature 230 on at least one performance metric 240 for determining at least one actionable item 350. An actionable item 350 is configured to modify a profile feature parameter 210 associated with one or more profile features 230 (e.g., number of topics in the web FAQ, number of pages on the support web site, and number of customer service representatives), which are predicted, based on the predictive model 500, to improve a performance metric parameter 210 associated with one or more performance metrics 240 (e.g., service cost per month) upon execution or implementation of the actionable item 350. One or more actionable items 350 may be implemented as executable code to modify one or more profile feature parameters 210.

In this example, the number of topics in the web FAQ, a number of pages on the support web site, and a number of customer service representatives are determined to be statistically relevant to improving a service cost per month. In at least some examples, one or more profile features 230 may be constrained. That is, one or more profile features 230 may have an upper threshold and/or a lower threshold. Additionally or alternatively, one or more profile features 230 may be a constraint. That is, a profile feature parameter 210 associated with one or more profile features 230 are considered to be fixed and, thus, are not considered for identifying an actionable item 350 and/or improving a performance metric parameter 210 associated with a performance metric 240. A profile feature parameter 210 may be constrained or be a constraint due to physical restrictions and/or financial restrictions, for example. In this example, the objective is to reduce a service cost per month without changing a number of customer service representatives. Accordingly, the information processing system 110 filters out the profile features 230 considered to be constraints (e.g., a number of customer service representatives) such that the profile features 230 considered to be constraints are not considered when generating an actionable item 350.

The predictive model 500 may be implemented to predict results for one or more performance metrics 240 using various combinations of one or more statistically-relevant profile features 230. In this example, the predictive model 500 is implemented to predict results for service cost per month as a function of number of topics in the web FAQ and number of pages on the support web site. Table 7 illustrates an affect of the two statistically-relevant profile features 230 on a performance metric 240:

TABLE 7

Predictive Model Results

| Number of Topics in the Web FAQ | Number of Pages on the Support Web Site | Predicted Service Cost per Month |
|---|---|---|
| 20 | 200 | 14,500,000 |
| 30 | 200 | 14,369,519 |
| 50 | 200 | 14,080,588 |
| 70 | 200 | 13,751,389 |
| 90 | 200 | 13,378,542 |
| 110 | 200 | 12,959,080 |
| 130 | 200 | 12,490,699 |
| 20 | 250 | 14,058,809 |
| 20 | 300 | 13,519,935 |
| 20 | 350 | 12,871,290 |
| 20 | 400 | 12,103,998 |
| 50 | 250 | 13,545,684 |
| 60 | 280 | 12,957,718 |
| 70 | 310 | 12,269,694 |

In this example, a current state of Company A has 20 topics in the web FAQ, 200 pages on the support web site, and a service cost of 14,500,000 per month (see FIG. 2 and Table 7). To improve the service cost per month approximately 1,500,000 such that the service cost per month is less than 13,000,000, the information processing system 110 may use the predictive model 500 to determine one or more actionable items 350 that are configured to modify a profile feature parameter 210 associated with at least one identified profile feature 230 such that, based on the generated predictive model 500, a performance metric parameter 210 associated with the performance metric 240 is predicted to improve upon execution of the one or more actionable items 350. In this example, the information processing system 110 identifies or determines three actionable items 350 that are predicted to improve the service cost per month by approximately 1,500,000: (1) the number of topics in the web FAQ may be increased from 20 to 110 while maintaining the number of pages on the support web site at 200, (2) the number of pages on the support web site may be increased from 200 to 350 while maintaining the number of topics in the web FAQ at 20, or (3) the number of topics in the web FAQ may be increased from 20 to 60 and the number of pages on the support web site may be increased from 200 to 280. Alternatively, any algorithm or operation may be used to determine one or more actionable items 350 that enables the information processing system 110 to function as described herein.

In one example, a set of parameters 210 (e.g., a first set) associated with a customer segment (e.g., a first customer segment) is identified, and an actionable item 350 (e.g., a first actionable item) associated with the customer segment is determined. For example, the set of parameters 210 for a particular customer segment may be different from the parameters 210 for a company in general. In this manner, an actionable item 350 is targeted to improving a performance metric parameter 210 associated with a performance metric 240 for a particular customer segment.

Additionally or alternatively, one set of parameters 210 (e.g., a first set) associated with one customer segment (e.g., a first customer segment) and one or more other sets of parameters 210 (e.g., a second set) associated with one or more other customer segments (e.g., a second customer segment) are identified, and the one customer segment is compared with the other customer segments to determine an actionable item 350 (e.g., a second actionable item) associated with the one customer segment and/or one or more of the other customer segments. For example, the set of parameters 210 for a particular customer segment may be different from a set of parameters 210 for another customer segment. In this manner, a particular customer segment is benchmarked against one or more other customer segments to determine a correlation, generate a predictive model, and/or generate an actionable item 350 to improve the customer segment relative to the other customer segments.

Additionally or alternatively, one set of parameters 210 (e.g., a third set) associated with one profile 220 (e.g., a first profile) and one or more other sets of parameters 210 (e.g., a fourth set) associated with one or more other profiles 220 (e.g., a second profile) are identified, and the one profile is compared with the other profiles to determine an actionable item 350 (e.g., a third actionable item) associated with the one profile and/or one or more of the other profiles. For example, the set of parameters 210 for a particular company may be different from a set of parameters 210 for another company. In this manner, a particular profile is benchmarked against one or more other profiles to determine a correlation, generate a predictive model, and/or generate an actionable item 350 to improve the profile relative to the other profiles.

Figure 6:
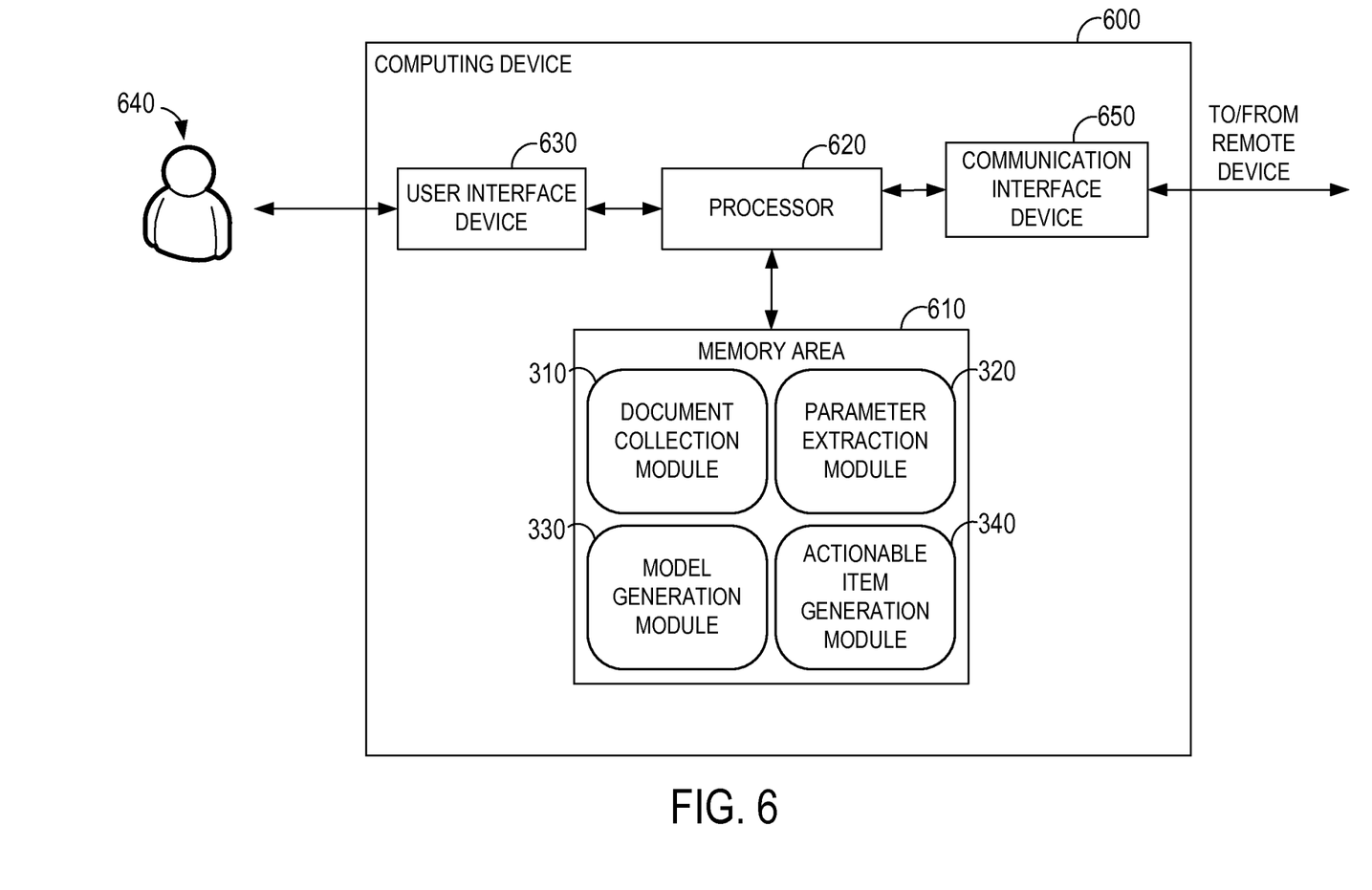
FIG. 6 is a block diagram illustrating an example computing device that may be used to implement a user interaction diagnostic engine in an environment, such as the environment shown in FIG. 1.

FIG. 6 illustrates an example computing device 600. While some examples of the disclosure are illustrated and described herein with reference to a computing device being an information processing system, aspects of the disclosure are operable with any computing device that executes instructions to implement the operations and functionality associated with the computing device. The computing device 600 may include a portable media player, a mobile telephone, a tablet, a netbook, a laptop, a desktop computer, a computing pad, a kiosk, a tabletop device, an industrial control device, a wireless charging station, an electric automobile charging station, and other computing devices. Additionally, the computing device 600 may represent a group of processing units or other computing devices. Additionally, any computing device described herein may be configured to perform any operation described herein including one or more operations described herein as being performed by another computing device.

The computing device 600 includes one or more computer-readable media, such as a memory area 610 storing computer-executable instructions, a document collection module 310, a parameter extraction module 320, a model generation module 330, an actionable item generation module 340, one or more profiles, or other data, and one or more processors 620 programmed to execute the computer-executable instructions for implementing aspects of the disclosure. The memory area 610 includes any quantity of media associated with or accessible by the computing device. The memory area 610 may be internal to the computing device (as shown in FIG. 3), external to the computing device (not shown), or both (not shown).

The processor 620 includes any quantity of processing units, and the instructions may be performed by the processor 620 or by multiple processors within the computing device or performed by a processor external to the computing device. The processor 620 is programmed to execute instructions such as those illustrated in the figures (e.g., FIG. 7).

The processor 620 is transformed into a special purpose microprocessor by executing computer-executable instructions or by otherwise being programmed. For example, the document collection module 310, when executed by the processor 620, causes the processor 620 to retrieve a plurality of documents from a plurality of knowledge sources; the parameter extraction module 320, when executed by the processor 620, causes the processor 620 to analyze one or more documents associated with one or more profiles to identify a plurality of parameters associated with one or more profile features and one or more performance metrics, analyze the one or more documents to identify the one or more profiles, analyze the one or more documents to identify the one or more profile features, analyze the one or more documents to identify the one or more performance metrics, identify a first parameter based on content of at least one document, and identify a second parameter based on a property of the at least one document; the model generation module 330, when executed by the processor 620, causes the processor 620 to determine one or more correlations between one or more profile features and one or more performance metrics to generate a predictive model, determine a correlation value associated with a profile feature and a performance metric, and use the predictive model to identify at least one profile feature; and the actionable item generation module 340, when executed by the processor 620, causes the processor 620 to determine whether one or more actionable items are determined based on a profile feature, and determine one or more actionable items configured to modify a profile feature parameter that is predicted to improve a performance metric parameter upon execution of the one or more actionable items. Although the processor 620 is shown separate from the memory area 610, examples of the disclosure contemplate that the memory area 610 may be onboard the processor 620 such as in some embedded systems.

The computing device 600 may include at least one user interface device 630 for exchanging data between the computing device 600 and a user 640 (e.g., user 160). The user interface device 630 includes or is coupled to a presentation device configured to present information, such as text, images, audio, video, graphics, alerts, and the like, to the user 640. The presentation device may include, without limitation, a display, a speaker, or a vibrating component. Additionally or alternatively, the user interface device 630 includes or is coupled to an input device configured to receive information, such as user commands, from the user 640. The input device may include, without limitation, a controller, a camera, a microphone, or an accelerometer. In at least some examples, the presentation device and the input device are integrated in a common user interface device 630 configured to present information to the user 640 and receive information from the user 640. The user-interface device may include, without limitation, a capacitive touch screen display, or a controller including a vibrating component.

The computing device 600 includes at least one communication interface device 650 for exchanging data between the computing device 600 and a remote device (e.g., a computer-readable media, another computing device). In at least some examples, the information processing system 110 is directly coupled to the knowledge source 130 or coupled to the knowledge source 130 via the network 140. Communication between the computing device 600 and a computer-readable media or another computing device may occur using any protocol or mechanism over any wired or wireless connection.

The block diagram of FIG. 6 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 6 may be performed by other elements in FIG. 6, or a computing device (e.g., a particularly-configured processor, web service, server, application, etc.) not shown in FIG. 6.

Figure 7:
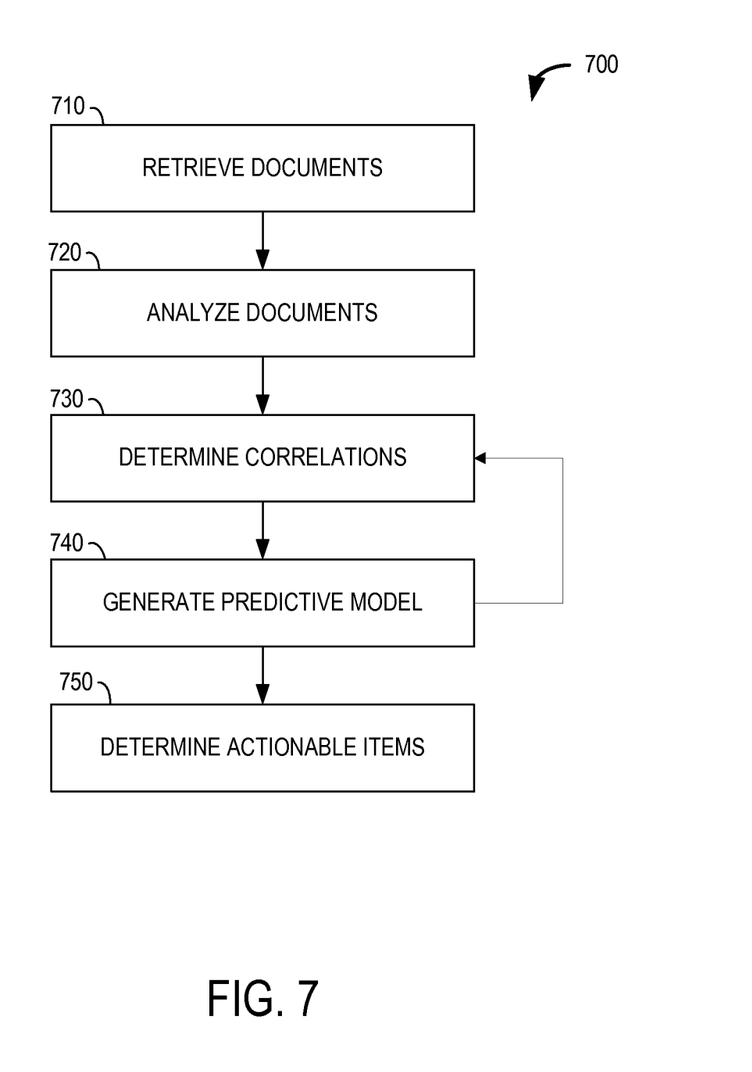
FIG. 7 is a flowchart illustrating an example method of implementing a user interaction diagnostic engine in an environment, such as the environment shown in FIG. 1.

FIG. 7 illustrates an example method 700 of implementing a user interaction diagnostic engine. The user interaction diagnostic engine enables a quality of service to be improved based on available user information. At 710 a plurality of documents 120 are received or retrieved from one or more knowledge sources 130. Documents 120 are collected from internal sources and/or external sources to robustly capture customer interactions and behavior data.

At 720, the documents 120 are processed or analyzed to identify relevant information (e.g., parameters 210, profiles 220, profile features 230, performance metrics 240, customer segments). For example, the documents 120 may be processed such that relevant information is filtered from noise. In some examples, one or more parameters 210 are identified or extracted from the documents 120.

At 730, one or more patterns or correlations between the parameters 210 are identified or determined, and, at 740, one or more predictive models are generated based on the correlations. The correlations may be used to identify one or more communication channels, companies, industries, and/or customer segments and sort or filter one or more parameters by the identified communication channels, companies, industries, and/or customer segments. In at least some examples, a predictive model is generated for each profile 220 and/or customer segment. In some examples, the correlations are determined at 740 concurrently, iteratively, or complementarily with determination at 730 of the predictive models. At 750, one or more actionable items 350 are generated or determined to modify one or more profile feature parameters 210 configured to improve one or more performance metric parameters 210. In at least some examples, at least some actionable items 350 are automatically determined and implemented by the information processing system 110.

The subject matter described herein enables a user interaction diagnostic engine to be automatically implemented such that an information processing system is configured to provide various capabilities including diagnosing user interaction-related issues and determining one or more actionable items to improve the user interaction-related issues.

Example computer-readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

The examples illustrated and described herein as well as examples not specifically described herein but within the scope of aspects of the disclosure constitute example means for automatically implementing a user interaction diagnostic engine. For example, the elements illustrated in FIGS. 1, 3, and 6, such as when encoded to perform the operations illustrated in FIG. 7 constitute at least an example means for retrieving a plurality of documents from a plurality of knowledge sources; an example means for analyzing a plurality of documents to identify a plurality of parameters and one or more profiles; an example means for identifying a parameter based on content; an example means for identifying a parameter based on a property; an example means for determining one or more correlations between a plurality of parameters; an example means for generating a predictive model associated with at least one profile; an example means for using a generated predictive model to identify at least one profile feature of the one or more profile features; an example means for determining one or more actionable items based on a identified profile feature; an example means for determining a correlation value associated with a profile feature and a performance metric; an example means for determining whether one or more actionable items are determined based on a profile feature; and an example means for determining one or more actionable items representative of one or more modifications to one or more parameters associated with the one or more profile features that are predicted to improve the one or more performance metrics upon execution of the one or more actionable items.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:

a memory area storing a plurality of documents and computer-executable instructions for implementing a user interaction diagnostic engine;

a processor configured to execute computer-executable instructions;

retrieving a plurality of documents from a plurality of sources;

analyzing a plurality of documents to identify a plurality of parameters associated with one or more profile features and one or more performance metrics;

analyzing one or more documents to identify one or more profiles;

analyzing one or more documents to identify one or more profile features;

analyzing one or more documents to identify one or more performance metrics;

identifying a parameter based on content of at least one document;

identifying a parameter based on a property of at least one document;

determining one or more correlations between a plurality of parameters;

determining one or more correlations values between one or more profile features and one or more performance metrics;

identifying at least one profile feature configured to improve a parameter associated with at least one performance metric;

generating a predictive model associated with one or more profile features and one or more performance metrics;

determining one or more actionable items configured to modify at least one profile feature;

determining whether one or more actionable items are determined based on a profile feature;

identifying a set of parameters associated with a target segment;

determining an actionable item associated with a target segment;

comparing a target segment with another target segment to determine an actionable item associated with one of the target segments;
identifying a set of parameters associated with a profile; and
comparing a first profile with another profile to determine an actionable item associated with one of the profiles.

In some examples, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

What is claimed is:

1. A system comprising:
a memory area storing a plurality of documents and computer-executable instructions; and
a processor that executes the computer-executable instructions to:
analyze the plurality of documents to identify a topical issue based on a content item in the plurality of documents and identify a plurality of parameters associated with a plurality of profile features and a plurality of performance metrics, wherein:
at least one parameter of the plurality of parameters is identified based on the content item in the plurality documents;
each of the plurality of parameters and the plurality of performance metrics is associated with at least one customer segment; and
each of the plurality of profile features is based on a factor controllable by a company associated with a corresponding profile;
based on the plurality of parameters, determine a plurality of correlation values between the plurality of profile features and one or more performance metrics of the plurality of performance metrics;
based on the plurality of correlation values, identify at least one profile feature of the plurality of profile features that improves one or more parameters associated with the one or more performance metrics, wherein to identify the at least one profile feature the processor is to further execute the computer-executable instructions to compare at least one of the plurality of correlation values to a predetermined threshold to determine if the at least one profile feature of the plurality of profile features is statistically relevant in improving the one or more parameters associated with the one or more performance metrics;
generate a predictive model associated with the plurality of profile features and the one or more performance metrics;
determine a relationship strength between each of the plurality of profile features and the one or more performance metrics; and
determine one or more actionable items that modify a parameter associated with the at least one profile feature such that, based on the comparison of the at least one of the plurality of correlation values to the predetermined threshold, the relationship strength between each of the plurality of profile features and the one or more performance metrics and the predictive model, the one or more parameters associated with the one or more performance metrics are predicted to improve upon execution of the one or more actionable items.

2. The information processing system of claim 1, wherein the processor further executes the computer-executable instructions to identify a parameter of the plurality of parameters based on content of at least one document of the plurality of documents.

3. The information processing system of claim 1, wherein the processor further executes the computer-executable instructions to identify a parameter of the plurality of parameters based on a property of at least one document of the plurality of documents.

4. The information processing system of claim 1, wherein the processor further executes the computer-executable instructions to:
identify a first set of parameters associated with a first target segment, the plurality of parameters including the first set of parameters associated with the first target segment; and
determine a first actionable item associated with the first target segment, the one or more actionable items including the first actionable item.

5. The information processing system of claim 4, wherein the processor further executes the computer-executable instructions to:
identify a second set of parameters associated with a second target segment, the plurality of parameters including the second set of parameters associated with the second target segment; and
compare the first target segment with the second target segment to determine a second actionable item associated with one of the first target segment and the second target segment, the one or more actionable items including the second actionable item.

6. The information processing system of claim 5, wherein the processor further executes the computer-executable instructions to:
identify a third set of parameters associated with a first profile, the plurality of parameters including the third set of parameters associated with the first profile;
identify a fourth set of parameters associated with a second profile, the plurality of parameters including the fourth set of parameters associated with the second profile; and
compare the first profile with the second profile to determine a third actionable item associated with one of the first profile and the second profile, the one or more actionable items including the third actionable item associated with the one of the first profile and the second profile.

7. The information processing system of claim 1, wherein the processor further executes the computer-executable instructions to:
identify one set of parameters associated with one target segment, the plurality of parameters including the one set of parameters associated with the one target segment;
identify one or more other sets of parameters associated with one or more other target segments, the plurality of parameters including the one or more other sets of parameters associated with the one or more target segments; and
compare the one target segment with the one or more other target segments to determine an actionable item associated with one of the one target segment and the one or more other target segments, the one or more actionable items including the actionable item associated with one of the one target segment and the one or more other target segments.

8. The information processing system of claim 1, wherein the processor further executes the computer-executable instructions to:
identify one set of parameters associated with a first profile, the plurality of parameters including the one set of parameters associated with the first profile;
identify one or more other sets of parameters associated with a second profile, the plurality of parameters including the one or more other sets of parameters associated with the second profile; and
compare the first profile with the second profile to determine an actionable item associated with one of the first profile and the second profile, the one or more actionable items including the actionable item associated with the one of the first profile and the second profile.

9. The information processing system of claim 1, wherein the plurality of performance metrics are factors that are representative of an effect or byproduct of one or more of the plurality of profile features.

10. A computer-implemented method, the method comprising:
retrieving a plurality of documents from a plurality of sources;
analyzing the plurality of documents to identify a topical issue based on a content item in the plurality of documents and identify a plurality of parameters, the plurality of parameters associated with a plurality of profile features and a plurality of performance metrics, wherein:
at least one parameter of the plurality of parameters is identified based on the content item in the plurality documents;
each of the plurality of parameters and the plurality of performance metrics is associated with at least one customer segment; and
each of the plurality of profile features is based on a factor controllable by a company associated with a corresponding profile;
based on the plurality of parameters, determining one or more correlations between the plurality of parameters;
determining one or more correlation values between the plurality of profile features and one or more performance metrics of the plurality of performance metrics;
based on the one or more correlation values, identifying one or more profile features of the plurality of profile features that improve a parameter associated with at least one performance metric of the plurality of performance metrics, including comparing at least one of the plurality of correlation values to a predetermined threshold to determine if the at least one profile feature of the plurality of profile features is statistically relevant in improving the one or more parameters associated with the one or more performance metrics;
generating a predictive model associated with the plurality of parameters;
determining a relationship strength between each of the plurality of profile features and the one or more performance metrics; and
determining one or more actionable items associated with one or more modifications to a parameter associated with the one or more profile features that, using the comparison of the at least one of the plurality of correlation values to the predetermined threshold, the relationship strength between each of the plurality of profile features and the one or more performance metrics and the predictive model, is predicted to improve the parameter associated with the at least one performance metric upon execution of the one or more actionable items.

11. The computer-implemented method of claim 10, wherein analyzing the plurality of documents comprises identifying a parameter of the plurality of parameters based on content of at least one document of the plurality of documents.

12. The computer-implemented method of claim 10, wherein analyzing the plurality of documents comprises identifying a parameter of the plurality of parameters based on a property of at least one document of the plurality of documents.

13. The computer-implemented method of claim 10, wherein analyzing the plurality of documents comprises:
identifying one set of parameters associated with one target segment, the plurality of parameters including the one set of parameters associated with the one target segment; and
identifying one or more other sets of parameters associated with one or more other target segments, the plurality of parameters including the one or more other sets of parameters associated with the one or more other target segments; and
wherein determining one or more actionable items comprises comparing the one target segment with the one or more other target segments to determine an actionable item associated with one of the one target segment and the one or more other target segments, the one or more actionable items including the actionable item associated with the one of the one target segment and the one or more other target segments.

14. The computer-implemented method of claim 10, wherein analyzing the plurality of documents comprises:
identifying one set of parameters associated with a first profile, the plurality of parameters including the one set of parameters associated with the first profile; and
identifying one or more other sets of parameters associated with a second profile, the plurality of parameters including the one or more other sets of parameters associated with the second profile; and
wherein determining one or more actionable items comprises comparing the first profile with the second profile to determine an actionable item associated with one of the first profile and the second profile, the one or more actionable items including the actionable item associated with the one of the first profile and the second profile.

15. The computer-implemented method of claim 10, wherein the plurality of performance metrics are factors that are representative of an effect or byproduct of one or more of the plurality of profile features.

16. A system comprising:
a processor;
a non-transitory computer readable medium storing instructions that when executed cause the processor to:
analyze a plurality of documents to identify a topical issue based on a content item in the plurality of documents and identify a plurality of parameters associated with a plurality of profile features and a plurality of performance metrics, wherein:
at least one parameter of the plurality of parameters is identified based on the content item in the plurality documents;

each of the plurality of parameters and the plurality of performance metrics is associated with at least one customer segment; and each of the plurality of profile features is based on a factor controllable by a company associated with a corresponding profile;

determine a plurality of correlation values between the plurality of profile features and one or more performance metrics of the plurality of performance metrics based on the plurality of parameters;

identify at least one profile feature of the plurality of profile features that improve one or more parameters associated with the one or more performance metrics based on the plurality of correlation values, wherein to identify the at least one profile feature the instructions when executed further cause the processor to compare at least one of the plurality of correlation values to a predetermined threshold to determine if the at least one profile feature of the plurality of profile features is statistically relevant in improving the one or more parameters associated with the one or more performance metrics;

generate a predictive model associated with the plurality of profile features and the one or more performance metrics;

determine a relationship strength between each of the plurality of profile features and the one or more performance metrics; and determine one or more actionable items that modify a parameter associated with the at least one profile feature such that, based on the comparison of the at least one of the plurality of correlation values to the predetermined threshold, the relationship strength between each of the plurality of profile features and the one or more performance metrics and the predictive model, the one or more parameters associated with the one or more performance metrics are predicted to improve upon execution of the one or more actionable items.

17. The system of claim 16, wherein the processor further executes the instructions to identify a parameter of the plurality of parameters based on content of at least one document of the plurality of documents.

18. The system of claim 16, wherein the processor further executes the instructions to identify a parameter of the plurality of parameters based on a property of at least one document of the plurality of documents.

19. The system of claim 16, wherein the processor further executes the instructions to:

identify a first set of parameters associated with a first target segment; and determine a first actionable item associated with the first target segment, wherein the plurality of parameters includes the first set of parameters associated with the first target segment, and the one or more actionable items includes the first actionable item associated with the first target segment.

20. The system of claim 16, wherein the processor further executes the instructions to:

identify one set of parameters associated with one target segment;

identify one or more other sets of parameters associated with one or more other target segments; and compare the one target segment with the one or more other target segments to determine an actionable item associated with one of the one target segment and the one or more other target segments, wherein the plurality of parameters includes the one set of parameters associated with the one target segment and the one or more other sets of parameters associated with the one or more other target segments, and the one or more actionable items associated with the one of the one target segment and the one or more other target segments includes the actionable item.

\* \* \* \* \*

UNITED STATES PATENT AND TRADEMARK OFFICE
CERTIFICATE OF CORRECTION

PATENT NO. : 10,832,143 B2
APPLICATION NO. : 14/956239
DATED : November 10, 2020
INVENTOR(S) : Junmin Yang et al.

Page 1 of 1

It is certified that error appears in the above-identified patent and that said Letters Patent is hereby corrected as shown below:

On the Title Page

At Item (30), Foreign Application Priority Data "15290190" should be "15290190.6".

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*